United States Patent [19]

Reighard et al.

[11] 3,912,630

[45] *Oct. 14, 1975

[54] FILTER CARTRIDGE FOR THERMOPLASTIC APPLICATOR SYSTEM

[75] Inventors: Alan B. Reighard, Bay Village; Simon Z. Tamny, Lorain, both of Ohio

[73] Assignee: Nordson Corporation, Amherst, Ohio

[ * ] Notice: The portion of the term of this patent subsequent to June 11, 1991, has been disclaimed.

[22] Filed: Oct. 25, 1973

[21] Appl. No.: 409,405

Related U.S. Application Data

[63] Continuation-in-part of Ser. No. 299,838, Oct. 24, 1972, Pat. No. 3,815,788.

[52] U.S. Cl. ............... 210/130; 210/134; 210/136; 210/234
[51] Int. Cl.² .................................. B01D 27/10
[58] Field of Search .......... 210/136, 134, 130, 234, 210/472, 436, 454, 489

[56] References Cited
UNITED STATES PATENTS

| | | | |
|---|---|---|---|
| 1,007,449 | 10/1911 | Keyes | 210/489 X |
| 2,017,350 | 10/1935 | Morgan | 210/166 |
| 2,191,636 | 2/1940 | Walker | 210/136 X |
| 2,349,416 | 5/1944 | Freeman | 210/136 X |
| 2,793,752 | 5/1957 | Jay | 210/234 X |
| 3,186,549 | 6/1965 | Botstiber | 210/136 X |
| 3,815,788 | 6/1974 | Reighard et al. | 222/189 X |

*Primary Examiner*—Frank A. Spear, Jr.
*Attorney, Agent, or Firm*—Wood, Herron & Evans

[57] ABSTRACT

An improved combination filter, check valve, relief valve cartridge for use in a hot melt applicator system of the type which includes a reservoir in which the hot melt material is heated and from which it is pumped through a manifold block to an applicator gun. The cartridge is so constructed that it may be installed or removed from the block as a unit and the filter may be separately removed for cleaning or replacement.

20 Claims, 2 Drawing Figures

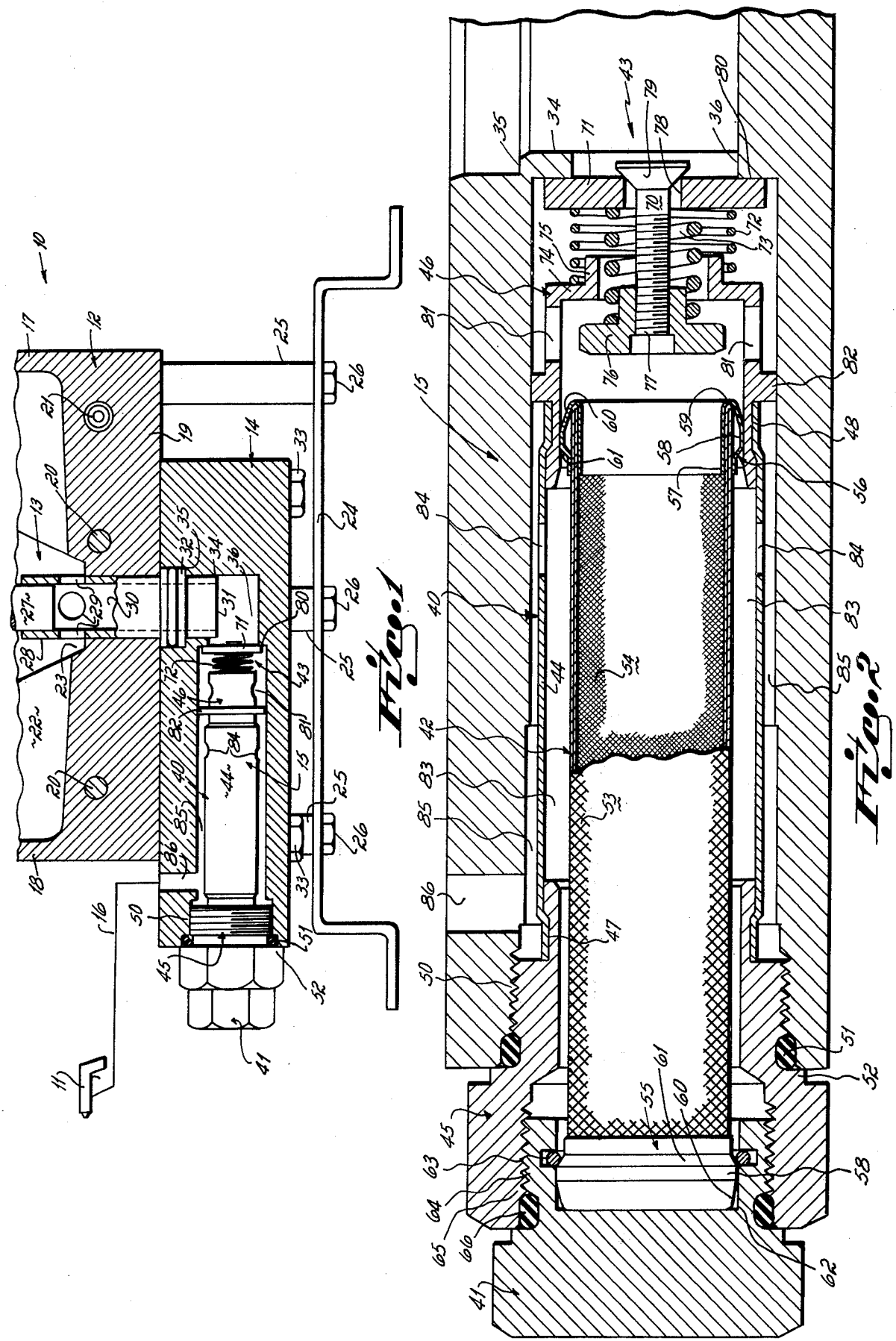

FILTER CARTRIDGE FOR THERMOPLASTIC APPLICATOR SYSTEM

This application is a Continuation-In-Part application of application Ser. No. 299,838, filed Oct. 24, 1972 for "Thermoplastic Applicator," which application is assigned to the assignee of this application, now U.S. Pat. No. 3,815,788.

This invention relates to the dispensing of thermoplastic material and particularly to the dispensing of materials of the so-called "hot melt" adhesive type. More particularly, this invention relates to dispensing systems in which solid thermoplastic material is melted and then pumped in a molten state to an applicator head or gun.

In the above identified patent application, upon which the invention of this application is an improvement, there is disclosed a dispensing applicator which comprises a heated melting tank or reservoir for receiving solid thermoplastic material, melting that material to convert it to a molten state and for pumping the melted material through a manifold block to a dispensing gun. Within the manifold block, there is a combination filter, check valve and relief valve cartridge in which the filter functions to insure that foreign objects or solid particulate materials do not pass from the pump to the gun and there clog the relatively small orifices and passageways. The cartridge includes a check valve so that the filter may be separately removed from the cartridge without first draining the reservoir and pump. Additionally, the cartridge includes a pressure relief valve to permit back flow of molten material to the reservoir when the pressure in the cartridge generated by evolving gases exceeds a preset value.

The combination filter, check valve and relief valve cartridge described in the above-identified application has many advantages over prior filter assemblies, primarily because of its capability of being removed from the dispenser as a subassembly and because of the capability of removing the filter separately from the cartridge while leaving the check valve and pressure relief valve in place as a barrier to flow of molten material from the reservoir so that the reservoir and pump need not be drained in order to clean or replace the filter.

In general, the combination filter check valve and relief valve cartridge described hereinabove has been very successful and has met with wide commercial acceptance. However, we have discovered that after prolonged usage, particularly in high volume applications, a problem occurs with the combination cartridge after the filter has been removed and cleaned numerous times. Specifically, we have discovered that degraded hot melt material collects as a solid residue both interiorly of the cartridge on the exterior of the filter and interiorly of the manifold around the exterior of the cartridge. When the filter is removed this residue is dislodged during removal and falls into the manifold and clogs the output passages. It has therefore been an objective of this invention to provide an improved combination filter check valve and relief valve cartridge in which the hot melt residue cannot collect in the manifold or remain in the manifold block upon removal of the filter cartridge and subsequently clog a clean or new filter screen.

We have discovered that the solid residue which collects on the exterior of the filter screen in the cartridge disclosed in the application upon which this invention is an improvement is at least partially scraped off of the exterior of the filter screen as the filter is removed from the cartridge. That scraped off residue enters that portion of the cartridge which is normally on the clean side of the filter and is available to contaminate the devices being supplied with hot melt adhesive.

It has therefore been another objective of this invention to provide an improved check valve pressure relief valve filter cartridge in which the solid particulate residue cannot collect on the exterior of the filter and therefore is prevented from remaining in the cartridge body or manifold block when the filter is removed for cleaning or replacement.

The filter cartridge disclosed in the above identified patent application operates upon the principle of pumping the molten material from the exterior of a cylindrical filter screen through the screen to its interior. The filtered molten material is then pumped through the interior of the screen along flutes of a fluted core to an exit port. This flow pattern enables the solid particulate residue to collect on the exterior of the filter screen and to at least partially be deposited in the cartridge body or manifold block when the filter screen is removed.

To eliminate this collection of residue upon the exterior of the screen, the improved combination filter cartridge of this invention utilizes a flow pattern in which the molten material is pumped to the interior of the filter screen through the screen to its exterior and subsequently from the exterior of the screen to an exit port of the manifold block. This flow pattern enables the solid residue material to be collected on the interior of the screen with the result that when the filter is removed from the cartridge body, substantially all of the solid particulate residue material is removed with it.

In order to maintain the rigidity of the filter screen while still constructing it of relatively fine mesh, the filter of this invention includes a cylindrical fine mesh screen surrounded and encased within a much more rigid large mesh screen. The large mesh screen thus provides "hoop" or shell strength and rigidity for the fine mesh filter.

The primary advantage of this improved combination cartridge is that it eliminates the problem of solidified degraded hot melt material residue collecting in the manifold block exteriorly of the filter screen and contaminating the devices being supplied with hot melt adhesive. Specifically, it enables all of the residue to be collected on the interior of the filter screen and removed with the screen for cleaning or replacement.

Another advantage of this improved combination cartridge is that it is less expensive to manufacture because it eliminates the relatively expensive solid fluted core required in the cartridge upon which it is an improvement.

Another advantage of this improved combination cartridge is the ease with which it facilitates cleaning. Because it has a straight through bore on the interior of the filter screen, it may be cleaned by dipping the screen in solvent and pushing a brush or plug through the interior of the filter (in much the same way that a shotgun bore is cleaned by pushing or pulling a plug through it).

In the preferred embodiment, the filter cartridge is connected to a bung or plug so that it may be inserted and removed from the cartridge with the plug. In this improved cartridge the filter snaps into the bung and is held in position by a round wire snap ring so that it may be easily inserted and removed for cleaning and replacement.

Another advantage of this improved combination cartridge is that it essentially eliminates all "dead spots" within the interior of the manifold block and exteriorly of the filter screen. By eliminating these dead spots, all molten material is swept through the manifold block and through the filter screen so that molten material cannot remain in the manifold while other material flows past it, thereby becoming degraded solid material as a consequence of excessive exposure to heat over a prolonged period of time.

These and other objects and advantages of the invention will be more readily apparent from the following description of the drawings in which:

FIG. 1 is a cross sectional view of a portion of a dispensing system incorporating the invention of this application; and FIG. 2 is an enlarged cross sectional view of a portion of FIG. 1.

Illustrative of a system of the type to which the invention of this application is applicable, there is illustrated in FIG. 1 of the drawings a portion of a complete dispensing system for receiving thermoplastic material in a solid form, converting the material to a molten state, and supplying the material under pressure to a dispensing gun. The system comprises a machine 10 for receiving the material in a solid state, melting it and supplying it at a pressure of from 200–1200 p.s.i. to a dispensing gun 11. Both the gun 11 and the machine 10 are pneumatically actuated and are interconnected by a pneumatic control system (not shown). A complete description of the system may be found in the above identified application, of which this application is a Continuation-In-Part application.

The machine 10 comprises a heated reservoir 12, a pneumatic motor (not shown) for actuating a pump 13 and a manifold block 14. A combination filter, check valve and relief valve cartridge 15 is located in the manifold block 14 and is so positioned that material must pass through it before being transported through a hose 16 to the dispensing gun 11. The invention of this application is concerned with that cartridge 15.

The reservoir 12 is preferably made from heavy cast aluminum. It comprises a top wall (not shown), a pair of side walls 17 and 18, a pair of end walls (not shown) and a bottom wall 19. In the preferred embodiment there is a pair of heating elements 20 cast into the bottom wall 19 of the reservoir. There is also an electrical thermostat 21 embedded in the bottom wall 19 for controlling the temperature of the heaters 20.

The top wall of the reservoir 12 has a large opening (not shown) covered by a movable lid (not shown) of a housing. Solid thermoplastic material is inserted into the interior chamber 22 of the reservoir through this opening. The heaters 20 of the reservoir then cause the solid material to be melted and, while in the molten state, to flow toward the lower front end 23 of the reservoir.

The melting temperature of many thermoplastic materials of the so-called hot melt type is in excess of 300° F. Consequently, the reservoir 12 must be insulated to prevent the escape of heat from the reservoir and to protect operators from contact with it. To that end, the reservoir 12 is encased in an insulative packing (not shown). This packing is in turn surrounded by a sheet metal housing (not shown).

The bottom of the reservoir 12 is spaced from a base 24 of the housing by heat insulation spacers 25 which surround bolts 26. These bolts extend through the spacers and are threaded into the bottom of the reservoir. The heat insulative spacers 25 insure the maintenance of an air gap between the base mounting bracket 24 and the bottom of the reservoir.

One end of the housing (not shown) encloses a control area (not shown) within which all of the electrical controls of the machine are housed. Since these controls form no part of the invention of this application, they have not been illustrated or described in detail. Generally, though, these controls function to control the flow of electrical power to the heaters 20 of the reservoir 12 as well as the heater (not shown) of the gun and the heating element of the conduit 16. To that end the electrical contacts (not shown) of these heating elements extend into the control area of the housing through suitable insulative packing.

Molten material from the reservoir 12 is supplied to the gun 11 at a pressure of between 200 and 1200 p.s.i., depending upon the material and the substrate to which it is applied. The pump 13 which pressurizes the molten material to this extent comprises a piston 27 on the lower end of a piston rod (not shown) and a sleeve 28. This sleeve has four radial ports 29 which open into the bottom 23 of the reservoir chamber 22. When the piston 27 is in the raised position illustrated in FIG. 1, molten material flows into the interior chamber 30 of the sleeve through the ports 29 so that upon subsequent downward movement of the piston 27, it causes a slug of molten material to be pushed through an outlet port 31 of the sleeve.

The sleeve 28 extends through the bottom wall 19 of the reservoir 12 and has a lower flange 32 abutting against the bottom of the reservoir. When the manifold 14 is secured onto the bottom of the reservoir by bolts 33, a stepped bore 34 of the manifold fits over the lower end of the sleeve 28 and a shoulder 35 of the bore 34 contacts the flange 32 of the sleeve to lock the flange 32 between the manifold and the bottom of the reservoir.

The vertical bore 34 of the manifold plate is intersected by a transverse bore 36. This latter bore is stepped and receives the filter, check valve, relief valve cartridge 15 which is the subject of this invention. Functionally, this cartridge 15 insures that the molten material which enters the gun 11 is free of particulate matter which might otherwise clog the small passages and orifices of the dispenser gun 11.

Filter, Check Valve, Relief Valve Cartridge

Referring now to FIG. 2, it will be seen that the filter, check valve, relief valve cartridge 15 (hereinafter referred to as a filter cartridge 15) comprises a three-piece cartridge body 40 within which there is secured a threaded plug 41 and an attached filter 42. The end of the cartridge body 40 remote from the threaded plug 41 is closed by a combination check valve and pressure relief valve assembly 43.

The three-piece cartridge body 40 comprises a tubular sleeve 44 swaged at one end over an end cap 45 and at the opposite end over a closure member or closure cap 46. The attachment between the three pieces 44, 45 and 46 comprises the swaging of the endmost sections of the sleeve 44 over and into annular recesses 47, 48 in the innermost sections of the end cap 45 and closure cap 46, respectively.

In order to secure the filter cartridge 15 in the manifold block 14, the outer end of the bore 36 is counterbored and threaded as indicated at 50. This threaded section of the bore 36 receives a threaded portion of the end cap 45. There is preferably an O-ring seal 51 sandwiched between a flange 52 of the end cap and the end of the manifold block to prevent molten material from leaking around the threads of the block.

The filter 42 comprises a pair of interfitting tubular cylindrical screens 53, 54 secured together in an integral assembly by a pair of identical rings 55, 56. Both screens 53, 54 extend for the full length of the filter and are attached to the rings 55, 56. Both screens 53, 54 are brazed or welded for the full length of the longitudinal seam so that each is formed into a cylindrical configuration before assembly with the other screen and with the end rings 55, 56.

The innermost cylindrical screen is a fine mesh screen which filters solid particulate material from the molten liquid material passing through the filter. In one preferred embodiment the inner fine mesh screen is a 70 × 80 mesh made from 0.007 inch diameter stainless steel wire in which the openings are 0.0055 × 0.0073 inches. The outer cylindrical screen functions to provide longitudinal and radial rigidity and strength for the inner screen as well as for the complete filter. In one preferred embodiment, the outer screen is made from 20 × 20 mesh, stainless steel screen of 0.018 inch diameter wire and having 0.032 inch openings.

Each end ring 55, 56 is identical and each is made from sheet metal shaped so as to define an inner annular section 57 and an outer cylindrical section 58 interconnected by a radiused end section 59. The inside surface of the inner annular section 57 is brazed or welded to the inside end surface of the inner screen 54, and the endmost portion 59 of the outer annular section 58 is brazed or welded to the outer surface of the outer screen 53.

To facilitate insertion and removal of the filter 42 into and out of the cartridge body 40 and to enable the filter to be attached to the end plug 41, the outer annular section 58 of the end rings 55, 56 defines a pair of oppositely tapered surfaces 60, 61. The endmost one (60) of these tapered surfaces functions to guide the filter 42 into an axial recess 62 in the end plug 41 and to spread a snap ring 63 located in that recess 62. The other tapered surface 61 is engaged by the snap ring 63 after insertion of the filter 42 into the recess 62 and this functions to retain the filter attached to the end plug 41. Because of this attachment, the filter may be attached to the plug and then inserted and removed from the cartridge body 40 by threading a threaded section 64 of the end plug 41 into a correspondingly threaded section 65 of the end cap 45. There is preferably an O-ring seal 66 around these threads to prevent leakage of molten material out through the threads between the plug 41 and the end cap 45.

The angle of surface 60 is rather shallow, i.e., 15° in reference to the axial centerline of the filter 54 and therefore, facilitates the insertion of either ring 55 or 56 into the recess 62 and through snap ring 63.

The angle of surface 61 is rather steep, i.e., 30° in reference to the axial centerline of filter 54 and therefore, tends to retard easy disengagement with the snap ring 63. In other words, a greater force is required to disengage the filter 54 from the plug 41, recess 62 and snap ring 63 than is required to insert it into the plug 41. Consequently, because the plug 41 and filter 54 are not easily separated from one another, they can be removed from the cartridge body 40 without separation of the two elements.

To remove the filter 42 for purposes of replacing or cleaning it, all that is required is to remove the end plug 41 and the attached filter as a unit from the cartridge body 40. After removal of the plug 41 from the cartridge body, the filter 42 may be pulled from the plug 41 so as to cause the snap ring 63 to spread and release the end ring. The filter may then be cleaned or replaced with a new clean filter, the clean or new filter inserted into the end plug 41, and the filter-plug assembly rethreaded into the end cap 45 of cartridge body 40.

The combination check valve-relief valve 43 comprises a relief valve plunger 70, a check valve plate 71 and a pair of springs 72, 73, all of which are held in an assembled relation by an inwardly extending flange 74 and hub 75 formed on the end of the closure cap 46. The relief valve plunger 70 has a flanged nut 76 threaded onto its inner end 77. The opposite end of the plunger extends through a hole 78 in the center of the check valve plate 71 and terminates in an outwardly flared tapered head 79. The outermost end of the head 79 is larger than the hole 78 so that the head of the plunger cannot pass through the hole. The inner spring 73 rests at one end against the inside surface of the check valve plate 71 and at the other end against the flanged nut 76 on the end of the plunger. Consequently, the spring 73 biases the plunger 70 away from the plate 71 and the head 79 of the plunger into a closed position relative to the check valve plate 71. The other spring 72 rests at one end against the flange 74 of the closure cap 46 and at the opposite end against the check valve plate 71. It biases the check valve plate 71 against a shoulder 80 of the bore 36 in the manifold block 14.

In operation, the plate 71 and the cooperating shoulder 80 of the manifold block 14 act as a one-way check valve because of the plate 71 being forced against the shoulder by the spring 72. When the hot melt adhesive pressure within the sleeve chamber 30 and the bore 34 is sufficiently great to generate a force sufficient to overcome the force of the spring 72, the plate moves away from the shoulder 80 and permits hot melt adhesive material to flow from the vertical bore 34 into the transverse bore 36 and subsequently through holes 81 of the closure cap 46 into the interior of the filter 42. An external flange 82 on the closure cap 46 blocks the flow of molten material over the exterior of the cartridge body 40 and insures that all of the molten material from the reservoir flows through the holes 81 in the closure cap 46 and into the interior of the filter 42.

If the pressure on the interior of the filter exceeds a preset value, the force generated by that pressure will cause the pressure relief valve to open and allow thermoplastic material to flow back from the filter 42 through the holes 81 and around the valve plunger 70 into the vertical bore 34. The need for this pressure relief valve arises because the thermoplastic material contained in the bore 36 and in the filter 42 as well as in the conduit 16 and the dispensing gun 11 due to the thermal expansion of the material during heating from a cool to a molten condition. Consequently, the pressure internally of the filter increases and must be relieved. The relief valve 76, 70, 79 enables the molten material to flow back through the filter chamber into the reservoir 12 when this condition obtains. The check valve, on the other hand, is intended to prevent flow of molten material from the reservoir 12 when the filter is replaced in the filter cartridge. When the filter 42 and the attached plug 41 are removed from the cartridge, the check valve 43 prevents molten material from flowing out of the reservoir so that the filter screen may be replaced without having to first drain the reservoir and the pump.

In operation, molten material is pumped under pressure from the reservoir 12 through the sleeve type pump 13 into the chamber or bore 34 of the manifold block and into and through the combination check valve-relief valve 43. After passage through the check valve, the molten material flow is forced through the holes 81 in the closure cap 46 into the interior of the filter 42. The material then passes through the filter screens 53, 54 to the exterior of the filter and through a chamber 83 located between the exterior of the filter 42 and the interior of the cartridge body 40. From this chamber 83 the molten material passes through holes 84 in the cartridge sleeve 44 into a manifold chamber 85 surrounding the cartridge body 40. From this manifold chamber 85, the molten material passes from the outlet port 86 of the manifold 14 to the dispenser gun 11 through the conduit 16. It is to be noted that in passing through the chamber 83 on the exterior of the filter 42, all of the molten material is swept through the holes 84 in the cartridge body 40 and out of the manifold block through the port 86, thus providing continuous flow of adhesive. The continuous flow of adhesive minimizes the tendency of having entrapped adhesive which will degrade.

In the preferred embodiment the conduit 16 is heated so as to maintain the material in a molten state. A heated flexible hose which is particularly suited to this application is disclosed in U.S. Pat. No. 3,585,361, which patent is assigned to the assignee of this application.

The dispensing gun 11 is a conventional pneumatically actuated gun which is commercially available and per se forms no part of the invention of this application. One such suitable gun is disclosed in U.S. Pat. No. 3,570,725, which patent is also assigned to the assignee of this application.

The primary advantage of the improved combination filter check valve-relief valve cartridge of this invention resides in its elimination of the collection of degraded hot melt material and solid particulate material on the interior of the manifold block. Its construction forces all of the hot melt material to pass into the interior of the tubular filter through the filter screen and subsequently through the cartridge chamber 83 and the manifold chamber 85 so that all residual solid particulate material and degraded material is deposited in the interior of the filter and prevented from blocking the outlet port 86. Consequently, when the filter is removed from the cartridge by removal of the end plug 41 and the attached filter, the collected residual solid material is removed from the filter.

Another advantage of this cartridge and filter construction is that the filter is very easily cleaned by
1. first soaking it in solvent at 350°–400° F.
2. passing a brush through the interior of the filter which, because of its smooth bore, is easily cleaned in the same manner as a shotgun bore,
3. again soaking the filter in solvent, and
4. again pushing a clean brush through the interior of the filter.

Still another advantage of this cartridge construction is the ease with which it facilitates replacement or cleaning of filter cartridges. The tapered end rings 55, 56 on the filter cartridge 42 and the snap ring 63 construction interiorly of the end plug enable either end of the filter cartridge to be snapped into the end plug without any difficult or time consuming manipulative steps or procedures.

While we have described only a single preferred embodiment of our invention, persons skilled in the art to which it pertains will readily appreciate changes and modifications which may be made without departing from the spirit of our invention. Therefore, we do not intend to be limited except by the scope of the following appended claims.

We claim:
1. For use in combination with a dispensing system, a manifold block having a generally cylindrical bore, said bore having an internally threaded section,
a combination filter, check valve, relief valve cartridge mounted in said manifold block bore, said cartridge comprising:
a generally cylindrical body, said body having an externally threaded section threaded into the internally threaded section of said manifold block,
A combination check valve-pressure relief valve mounted to said body so as to be removable therewith from the manifold block,
a removable filter retainer mounted in said body,
a replaceable filter attached to said filter retainer, said filter including a filtering screen,
said filter retainer and filter being separately removable from said body while said combination check valve-relief valve is retained in said body, and
means defining a flow path through said cartridge from said check valve, into the interior of said filter, through said filter screen to the exterior of said filter and from the exterior of said filter to the exterior of said cartridge.

2. The manifold blocks and cartridge of claim 1 in which said filter comprises a fine mesh filter screen surrounded by and encased within a relatively rigid coarse mesh screen.

3. The manifold blocks and cartridge of claim 2 in which said filter includes a pair of end caps fixedly secured to the opposite ends of said screens.

4. The manifold block and cartridge of claim 3 in which at least one of said end caps of said filter includes a pair of oppositely tapered surfaces, and said filter retainer of said cartridge having a recessed bore within which there is located an elastic ring, said elastic ring being operable in cooperation with said tapered surfaces of said end cap to retain said filter attached to said filter retainer so that the filter and filter retainer are removable from the cartridge body as a subassembly.

5. The manifold block and cartridge of claim 1 in which said combination check valve-pressure relief valve comprises:
a pressure relief valve plunger slidably mounted to the end of said body, a check valve plate slidably mounted over said plunger, said plate having a first valve seat adapted to engage a supporting element and a second valve seat engageable with said plunger, first spring means for urging said plate into engagement with said supporting element such that said plate, first spring means and first seat together from a one-way flow check valve, and second spring means for urging said plunger into engagement with said second seat such that said plunger, second spring means, and plate together form a pressure relief valve for relieving excessive pressure internally of said body.

6. For use in combination with a dispensing system, a manifold block having a generally cylindrical bore, said bore having an internally threaded section, a combination filter, check valve, pressure relief valve cartridge mounted in said manifold block bore, said cartridge comprising:

a generally cylindrical body, said body having a combination check valve-relief valve mounted to one end and a plug mounted in the opposite end, said body having an externally threaded section threaded into the internally threaded section of said manifold block, said cartridge further including a filter having a filter screen, said filter being attached to said plug, means supporting said plug and filter in said body so that said plug and filter are separately removable from said cartridge body while said combination check valve-relief valve is retained in said body, and means defining a flow path through said cartridge from said check valve, into the interior of said filter, through said filter screen to the exterior of said filter, and from the exterior of said filter to the exterior of said cartridge.

7. The manifold block and cartridge of claim 6 in which said combination check valve-pressure relief valve comprises:

a pressure relief valve plunger slidably mounted in the end of said body, a check valve plate slidably mounted over said plunger, said plate having a first valve seat adapted to engage a supporting element, said plate having a second valve seat engageable with said plunger, first spring means for urging said plate into engagement with said supporting element such that said plate, first spring means and first seat together form a one-way flow check valve, and second spring means for urging said plunger into engagement with said second seat such that said plunger, second spring means, and plate together form a pressure relief valve for relieving excessive pressure internally of said body.

8. The manifold block and cartridge of claim 6 in which said filter comprises a fine mesh filter screen surrounded by and encased within a relatively coarse mesh screen.

9. The manifold block and cartridge of claim 8 in which said filter includes a pair of end caps fixedly secured to the opposite ends of said screens.

10. The cartridge of claim 9 in which at least one of said end caps of said filter includes a pair of oppositely tapered surfaces, and said plug of said cartridge having a recessed bore within which there is located an elastic ring, said elastic ring being operable in cooperation with said tapered surfaces of said end cap to retain said filter attached to said plug so that the filter and plug are removable from the cartridge body as a subassembly.

11. The manifold block and cartridge of claim 9 in which said end caps are identical in geometric configuration.

12. The manifold block and cartridge of claim 11 in which said combination check valve-pressure relief valve comprises:

a pressure relief valve plunger slidably mounted in the end of said body, a check valve plate slidably mounted over said plunger, said plate having a first valve seat adapted to engage a supporting element and a second valve seat engageable with said plunger, first spring means for urging said plate into engagement with said supporting element such that said plate, first spring means and first seat together form a one-way flow check valve, and second spring means for urging said plunger into engagement with said second seat such that said plunger, second spring means, and plate together form a pressure relief valve for relieving excessive pressure internally of said body.

13. For use in combination with a dispensing system, a manifold block having a generally cylindrical bore, said bore having an internally threaded section, a combination filter, check valve, relief valve cartridge mounted in said manifold block bore, said cartridge comprising:

a generally cylindrical tubular body, said body having an externally threaded section threaded into the internally threaded section of said manifold block, a combination check valve-pressure relief valve fixedly mounted to said body so as to be removable therewith from said manifold block, a removable end plug mounted in said body, a tubular filter replaceably mounted in said body, said tubular filter comprising a first tubular filter screen encased within and fixedly secured to a second tubular filter screen, one of said filter screens being of fine mesh and the other filter screen being of coarse mesh, said coarse mesh filter screen providing structural rigidity for the fine mesh filter screen.

14. The manifold block and cartridge of claim 13 in which said end plug and filter are separately removable from said cartridge body while said combination check valve-relief valve is retained in said body.

15. The manifold block and cartridge of claim 14 in which said filter includes a pair of end caps fixedly secured to the opposite ends of said tubular screens.

16. The manifold block and cartridge of claim 15 in which each of said end caps of said filter includes a pair of oppositely tapered surfaces, and said end plug of said cartridge having a recessed bore within which there is located an elastic ring, said elastic ring being operable in cooperation with one of said tapered surfaces of one of said end caps to retain said filter attached to said end plug so that the filter and end plug are removable from the cartridge body as a subassembly.

17. The manifold block and cartridge of claim 16 in which said combination check valve-pressure relief valve comprises:

a pressure relief valve plunger slidably mounted in the end of said body, a check valve plate slidably mounted over said plunger, said plate having a first valve seat adapted to engage a supporting element and a second valve seat engageable with said plunger, first spring means for urging said plate into engagement with said supporting element such that said plate, first spring means and first seat together form a one-way flow check valve, and second spring means for urging said plunger into engagement with said second seat such that said plunger, second spring means, and plate together form a pressure relief valve for relieving excessive pressure internally of said body.

18. The manifold block and cartridge of claim 13 in which one end of said filter is replaceably attached to said end plug and the opposite end of said filter is in sliding/sealing engagement with said body.

19. The manifold block and cartridge of claim 18 in which said opposite end of said filter in sliding/sealing engagement with said body defines an opening into the interior of said filter.

20. The manifold block and of claim 19 in which said opening defines a flow path into the interior of said filter.

* * * * *